United States Patent Office 3,394,286
Patented July 23, 1968

3,394,286
ULTRAHIGH VACUUM MEASURING
IONIZATION GAUGE
Frank J. Brock, Winchester, Mass., assignor to National Research Corporation, Cambridge, Mass., a corporation of Massachusetts
Filed May 27, 1965, Ser. No. 459,407
1 Claim. (Cl. 315—111)

ABSTRACT OF THE DISCLOSURE

An ionization gauge for measuring ultrahigh vacuum levels comprising separate ionization and collector regions connected at an ionization region exit with the addition that a modulator electrode is located at the exit. In addition to the standard modulation function, the modulator in this location yields a surprising increase in collector current, apparently due to improved focussing and extraction of ions from the ionization region.

---

The present invention relates to vacuum gauges and particularly to the measurement of ultrahigh vacuum (pressures of $10^{-9}$ torr and below). The invention described herein was made in the performance of work under a NASA contract and is subject to the provisions of the National Aerouautics and Space Act of 1958, Public Law 85–568 (72 Stat. 426, 42 U.S.C. 2451) as amended. A license has been granted to the United States Government for practice of the invention and title to the invention and this patent have been reserved to the assignee; subject to voidability by NASA.

It is the principal object of the invention to provide an improved hot filament ionization gauge which can be used to measure pressures below lower limits of prior art hot filament gauges using the combined techniques of modulation and suppression.

It is a further object of the invention to provide an ultrahigh vacuum measuring ionization gauge characterized by ease of startup at low pressures and the ability to operate without the aid of a magnet.

It is a further object of the invention to provide an ionization gauge with structure for measuring spurious electric currents which tend to mask the pressure dependent electric current at ultrahigh vacuum conditions.

It is a further object of the invention to provide modulator electrode structure in a suppressor gauge which presents minimum interference with the suppressor gauge.

Other objects and advantages of the invention will in part be obvious and will in part appear hereinafter.

The invention accordingly comprises an improved hot filament ionization gauge for measuring ultrahigh vacuum pressures.

Before describing my invention in detail, it is useful to consider the prior art. It has long been recognized that a lower pressure limit is set on the usefulness of hot filament ionization gauges by a spurious electron current leaving the ion collector. This electron current is primarily a photo-emission phenomenon induced by the glowing filament and X-rays produced within the gauge. In 1950 Bayard and Alpert inroduced an improved gauge which minimized this limitation by making the ion collector in the form of a fine wire (Review of Scientific Instruments, vol. 21, p. 571, 1950). This innovation made it possible to reduce the lower limit of hot filament gauges to $10^{-10}$ mm. Hg abs. (torr). Further reduction in the lower limit (to $3 \times 10^{-11}$ torr and lower, depending upon ability of the operator to analyze the characteristics of a particular gauge) was made possible by an improved version of the Bayard-Alpert gauge introduced by Redhead in 1960 and known as the modulated Bayard-Alpert gauge (Review of Scientific Instruments, vol. 31, p. 343, 1960). The modulated Bayard-Alpert gauge provides a secondary fine wire collector electrode (the modulator) which is operated at grid potential and at some collector potential. The latter operation deprives the principal collector of some of its normal collector of ions. The following Equation 1 is applicable at any given pressure.

$$i = \frac{I_2 - I_1}{\alpha - 1} \quad (1)$$

where $\alpha$ is the modulation coefficient of a particular gauge determined experimentally at pressures sufficiently high that the spurious electron currents are negligible $$(\alpha = I_2/I_1)$$

$I_2$ being the measured collector current obtained while the modulator is at the same potential as the collector (e.g. ground);

$I_1$ being the measured collector current in the absence of modulation (the modulator being operated at same potential as the gauge anode);

And $i$ being the true ion current which varies linearly with pressure in contrast to $i_e$ which is the pressure independent electron current which masks $i$ at ultrahigh vacuum.

The above equation is made with the limiting assumption that $\alpha$ as applied to $i_e$ is zero—an assumption which is sufficiently correct for the purposes of the present invention.

Another approach to lowering the limit of measurement is embodied in the suppressor gauge introduced by Schuemann (1962 Transactions of the American Vacuum Society-Pergammon Press, p. 428). The suppressor gauge uses a large collector which is shielded from the glowing filament by a collector shielding enclosure. Inside the enclosure there is provided a suppressor electrode. Thus, the causes of electron emission from the collector are drastically reduced and such emission as might occur due to X-ray flux impinging on the collector is prevented as the negatively biased suppressor reflects electrons back to the collector.

The techniques of suppression and modulation are not readily combinable because the presence of each would tend to complicate the other. However, I have discovered a structure which makes such combination feasible and useful and I have applied this discovery to the accurate calculation of pressures well below the limits of either the known suppressor and modulated Bayard-Alpert gauges.

The present invention is now explained with reference to a preferred embodiment which is described below and in the accompanying drawings wherein.

Figure 1:
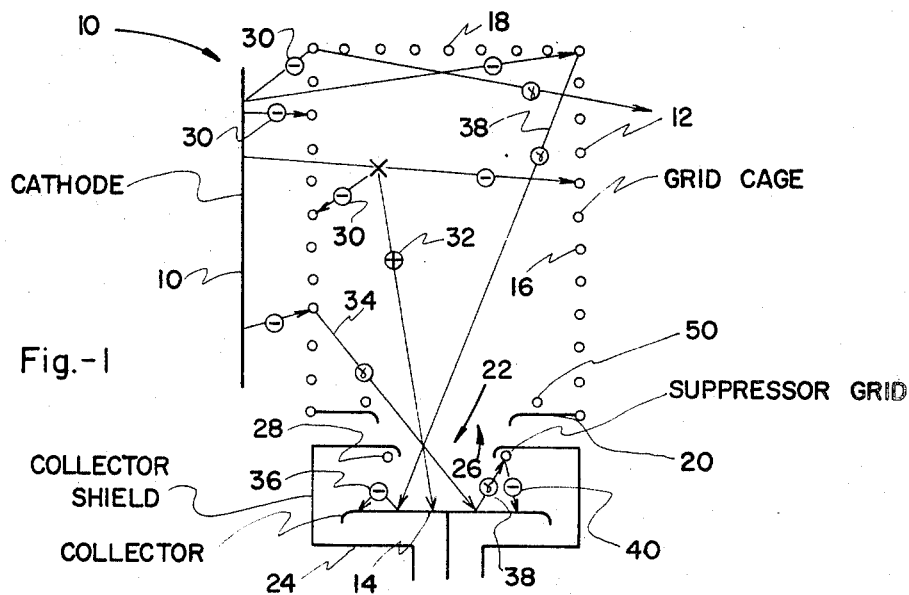
FIG. 1 is a schematic drawing of a gauge made in accord with the invention.
Figure 2:
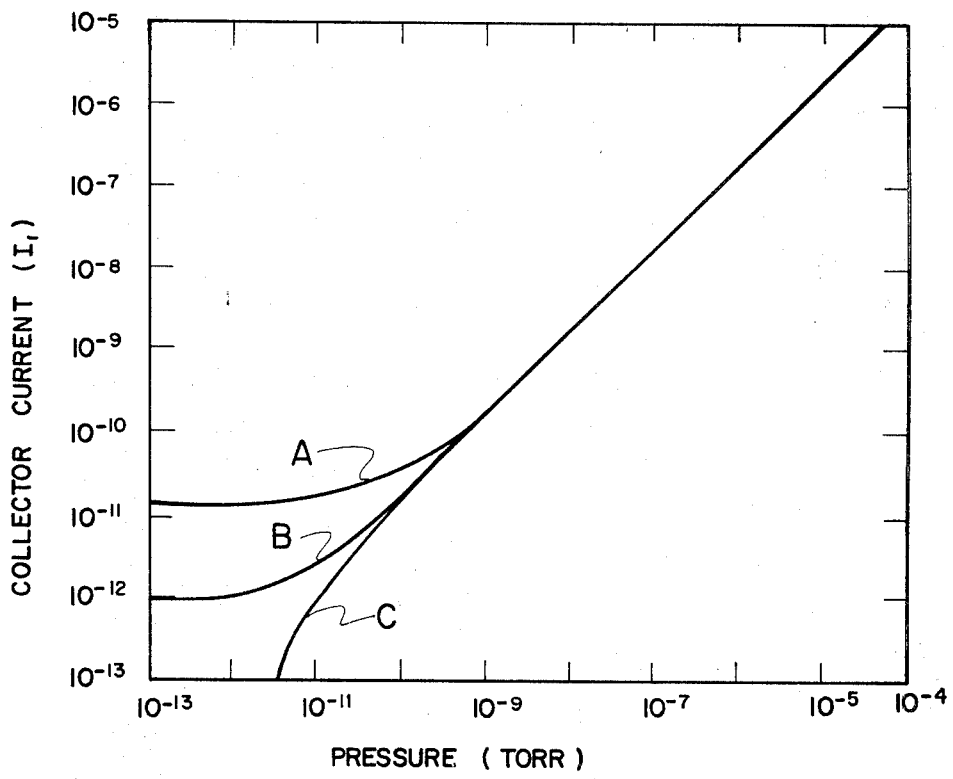
FIG. 2 is a series of curves showing the collector current of the gauge as a function of pressure for different modes of operation.

Referring now to FIG. 1, the present gauge 10 comprises the usual ionization gauge elements—a filament 10, an anode 12 and a collector 14. The particular construction of the anode is a modified suppressor gauge construction developed by the National Research Council of Canada and comprises a cage made of annular wires 16, straight wires 18 and an annular exit plate 20 defining an exit aperture 22.

The collector 14 is shielded by an enclosure 24 which defines an inlet aperture 26. A suppressor electrode 28 having the form of a wire ring is within the enclosure and masked by the enclosure from ions outside the enclosure.

According to the preferred embodiment of the invention a modulator electrode 50 having the form of a wire ring is located within the anode and arranged so that the said annular exit plate 20 of the anode substantially masks the modulator from line of sight vision of the collector through the apertures 22 and 26. The modulator is disposed at the exit end of the anode cage.

The principal actions of mass and energy transfer within the gauge are schematically indicated in FIG. 1. Electrons 30 are emitted from the hot filament 10 and eventually collected by the anode 12. Prior to collection, some electrons collide with gas molecules and produce positive ions 32 of the gas which are accelerated towards the collector 14 and electrons 33 which are accelerated towards the anode 12. Positive ions 32 moving through the length of the anode cage and apertures 22 and 26 are not disturbed by the modulator 50 which is maintained at anode potential and arranged outside the ion path. The ions collected at 14 provide the pressure dependent current $i$ which is sought to be measured. The collector is also subject to soft X-ray photons 34 from the anode cage 12, and from the ionizing collisions occurring within the cage. Secondary electrons 36 are generated by the X-rays impinging on the collector. The negatively raised suppressor 28 reflects these electrons back to the collector and there is no steady state disturbance of the total collector current.

However, some X-rays 38 are reflected (or generated) at the collector; and, to the extent that these reflected X-rays are intercepted by the suppressor, there is a tendency towards secondary electron emission (indicated by 40) from the suppressor and a high probability that such secondary electrons will reach the collector to produce a current with a sign opposite to that of the collected ion current. This last point was determined by a gauge calibration experiment in which the above-described gauge was operated under conditions of—

| | | |
|---|---|---|
| Emission current | ma | 1 |
| Anode voltage | v | 150 |
| Filament voltage | v | 35 |
| Modulator voltage | v | 150 |
| Shield | | 0 |

Calibration curves A, B, C and D were plotted using helium as a calibration gas and using readings from a modulated Nottingham gauge as the standard of "actual" pressure (nitrogen equivalent). The Nottingham gauge was operated at higher pressures and coupled to the present gauge via a pressure ratio calibration apparatus. The curve A was plotted with the suppressor grid voltage at zero, the curve B at −575 volts and the curve C at −665 volts. Complete suppression was obtained in the run indicated by curve C. The deviation of curve C from linear indicates that the ejection of electrons 36 is completely suppressed and the magnitude of deviation is essentially a measure of the electron current 40. The conditions for curve D were the same as for C except that modulation was applied.

Figure 3:
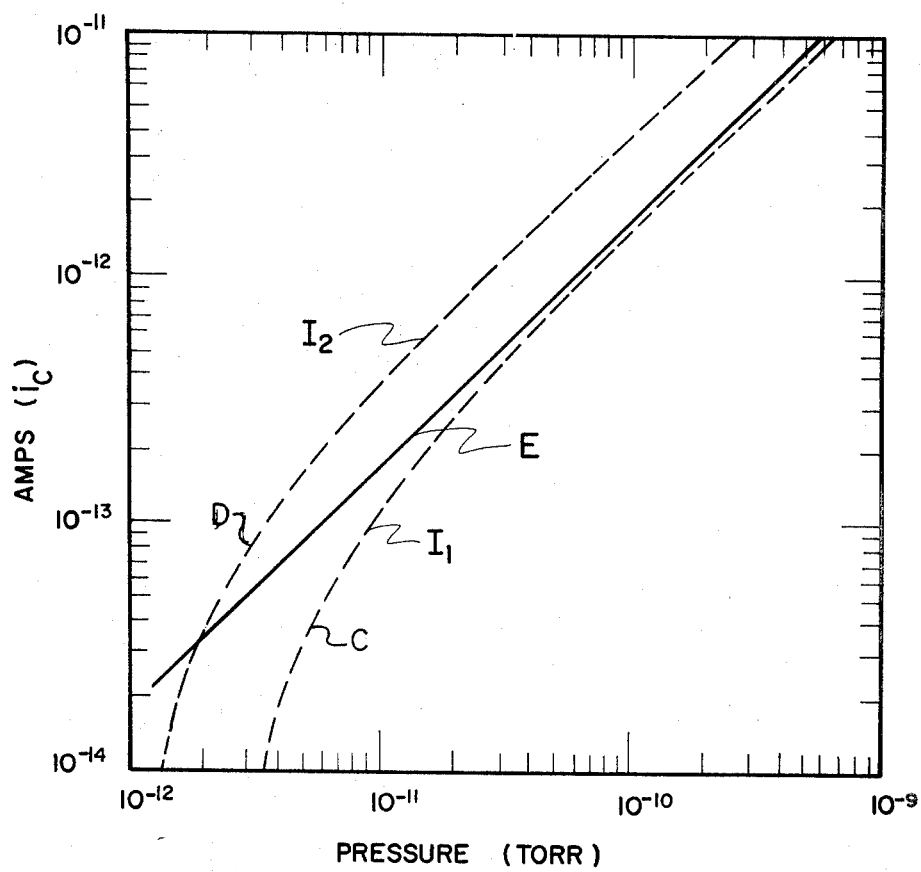
FIG. 3 is a curve showing the calculated calibration of the gauge of FIG. 1 using the data from FIG. 2.

When the potential of the modulator is dropped to zero volts (curve D), the situation changes in that about 30–40% of the ions are collected by the modulator and one would suppose that the collection of ions by the collector is correspondingly reduced. However, at ultrahigh vacuum pressures, the collector current is actually increased as indicated by the curves of FIG. 3. The reason for this is due to an improved focussing and extraction of the ion flux provided by the location of the modulator in accord with the present invention. The constant of modulation was determined to be 2.2 for this particular gauge. Applying Equation 1 above, curve E was plotted to provide a true reading of the pressure dependent ion current.

It is apparent from the FIG. 3 results that pressures below $10^{-12}$ torr (nitrogen) or down to the extinguishing point of the gauge, may be calculated from measurements made by the improved gauge of my invention as indicated by the analysis in U.S. Patent 3,310,699.

While a preferred embodiment of my invention has been shown in FIG. 1, it will be apparent that other embodiments may be made within the scope of my invention. It is therefore intended that the above material and accompanying drawing shall be read as illustrative and not in a limiting sense.

What is claimed is:

1. An improved hot filament gauge of the suppressor type comprising
   (a) ionization electrode means, including a cathode and an anode cage, the anode cage having ion exit forming means forming a cage exit for ions produced by ionization within said anode cage;
   (b) shield electrode means forming an enclosure and having an entrance, the entrance being aligned with said anode cage exit to form a flow path for ions;
   (c) a collector electrode and a suppressor electrode mounted in said enclosure;
   (d) an annular modulator electrode located adjacent said ion exit of the anode cage and being within said anode cage and arranged so that said ion exit forming means partially masks the modulator electrode from said enclosure.

References Cited
UNITED STATES PATENTS

| | | | |
|---|---|---|---|
| 3,001,128 | 9/1961 | Nottingham | 324—33 |
| 3,193,724 | 7/1965 | Klopfer | 313—7 |
| 3,292,078 | 12/1966 | Herzog | 317—7 |

DAVID J. GALVIN, *Primary Examiner.*